united States Patent Office
3,086,950
Patented Apr. 23, 1963

3,086,950
PROCESS FOR THE PRODUCTION OF CONCENTRATED AQUEOUS SOLUTIONS OF WATER-SOLUBLE POLYACRYLIC ACID AMIDE
Gunther Renner, Dusseldorf-Holthausen, Germany, assignor to Henkel & Cie G.m.b.H., Dusseldorf-Holthausen, Germany, a corporation of Germany
No Drawing. Filed Aug. 17, 1959, Ser. No. 833,960
Claims priority, application Germany Aug. 22, 1958
2 Claims. (Cl. 260—29.6)

This invention relates to a process for the production of concentrated aqueous solutions of water-soluble polyacrylic acid amide by the direct polymerization of aqueous solutions containing monomeric acrylic acid amide in concentrations in excess of 10% in the presence of copper ions and with the aid of conventional water-soluble, free-radical-forming polymerization catalysts.

Polymerization of acrylic acid amide in aqueous solutions has heretofore produced a water-soluble polyacrylic acid amide only if the starting material was a solution of the monomer having a concentration below about 10% by weight. If a concentrated aqueous solution was polymerized, polymeric products were obtained which were merely swellable but not soluble in water.

Previously for the production of concentrated aqueous solutions of a water-soluble polyacrylic acid amide, which solutions are of interest for many uses, it was necessary to concentrate dilute solutions by evaporation. It has also been proposed to produce these concentrated solutions by polymerizing monomeric acrylic acid amide under carefully controlled conditions. For example, by a stepwise addition of small amounts of catalyst and by a gradual increase of the temperature, a water-soluble polymerization product has been obtained from an about 10% aqueous solutions of monomeric acrylic acid amide. This process, however, is awkward and time-consuming and does not produce any substantial improvement in the concentration of the water-soluble polyacrylic acid amide.

It has further been proposed to polymerize acrylic acid amide in an approximately 10% aqueous-alcoholic solution. However, no substantial improvement with respect to concentration has been obtained in this manner and in addition, the alcohol content of the polymeric solution is disadvantageous in many cases.

A further process has been described in which, at a concentration of more than 10%, a water-soluble polymerization product is obtained by a mixed polymerization of acrylic acid amide and methacrylic acid amide. This process, however, requires the use of mixed monomers and produces a random polymeric mixture.

It is an object of this invention to prepare aqueous solutions of water-soluble polyacrylic acid amide in concentrations in excess of 10% by direct polymerization of aqueous solutions of monomeric acrylic acid amide in concentrations in excess of 10% by weight.

It is a further object of this invention to polymerize monomeric acrylic acid amide in solutions of about 10% to about 50% concentration in the presence of copper ions and recover water-soluble polyacrylic acid amide as a solid or in a concentrated aqueous solution.

These and further objects of this invention will become apparent as the description thereof proceeds.

I have found a process which makes it possible to produce concentrated, aqueous solutions of water-soluble polyacrylic acid amide in a very simple fashion. In accordance with the present invention, the polymerization takes place with the aid of water-soluble, free-radical-forming polymerization catalysts in the presence of small amounts of copper ions, under polymerization conditions.

In accordance with the novel process, aqueous solutions containing more than 10% of monomeric acrylic acid amide can be transformed into clear, viscous polymerizate solutions. The upper limit for the concentration of the solutions to be polymerized is limited by the fact that at a concentration above 50% the polymerization reaction proceeds very violently and can therefore no longer be carried out on an industrial scale.

The viscosity of the polymerizate solutions obtained by the process of the invention depends upon the amount of copper ions added thereto in relation to the concentration of the monomeric acrylic acid amide in the solution. The greater the amount of copper ions which is added at a given monomer concentration, the lower the viscosity of the polymerizate solution. More concentrated monomer solutions require greater amounts of copper ions than less concentrated monomer solutions in order to give similar viscosities in the polymerizate solutions. In order to obtain water-soluble polymerizates, amounts of copper ions as low as about 0.01% by weight, based on the amount of monomeric acrylic acid amide, are sufficient. Depending upon the desired viscosity of polymerizate solution, larger amounts of copper ions up to 3% by weight may also be added. The copper ions may be added to the solution of the monomer to be polymerized, in the form of any desired water-soluble copper salt, which will dissolve to give copper ions, for example, $CuSO_4 \cdot 5H_2O$. Water-soluble cuprous salts which will dissolve to give copper ions are also suitable for this purpose. The copper ions may also be obtained by adding copper in the form of a copper salt or even copper powder, during the production of the monomeric acrylic acid amide by hydrolysis of acrylonitrile with sulfuric acid. In this hydrolysis, copper ions act as an inhibitor. If added before the hydrolysis of acrylonitrile, care should be taken that during the removal of sulfuric acid, which can be accomplished with the aid of lime, the copper ions are not also partially or entirely removed.

The polymerization is effected with the aid of water-soluble, free-radical-forming polymerization catalysts, as for example peroxides, such as hydrogen peroxide, potassium persulfate, ammonium persulfate, diacetyl peroxide or also suitable azo-compounds.

The temperature at which the polymerization is performed may vary within wide limits. Most advantageously, the polymerization is carried out at a temperature between about 40° C. and about 100° C.

The polymerization may be performed in any convenient reactor capable of maintaining a fairly constant temperature since the reaction requires heat initially and thereafter is exothermic and requires cooling.

The aqueous, concentrated water-soluble polyacrylic acid amide solutions prepared in accordance with the process of the invention may be diluted with water in any desired ratio. The concentrated solutions are substantially more stable against attack from mold, fungus, and bacteria than the dilute solutions obtained by any of the previously known processes.

Solid, water-soluble polyacrylic acid amide can be produced by flocculating the polymerizate from the concentrated aqueous solution by adding small amounts of water-miscible organic solvents such as methanol, ethanol or acetone. In comparison to the previously known processes, therefore, the present process makes it possible to save considerable quantities of solvents in flocculating the water-soluble polyacrylic acid amide. The production of solid water-soluble polyacrylic acid amide is thus rendered considerably more economical.

The concentrated, aqueous, water-soluble polyacrylic acid amide solutions obtained by the process according to the invention are transparent and dry into a clear film. They are useful for various purposes for which viscous, aqueous solutions or pastes are required, for example as emulsifying agents, thickening agents, impregnating agents, finishing agents, sizing agents, binding agents, adhesives and hair dressings.

The following examples are illustrative of the invention and will enable persons skilled in the art to better understand and practice the invention. It is to be understood, however, that these examples are not to be construed as limiting the invention in any manner.

EXAMPLE I 20 gm. of monomeric acrylic acid amide were dissolved in 80 gm. of water and 0.078 gm. of $CuSO_4.5H_2O$ were added to the solution. This is equivalent to 0.1% of copper ions based on the weight of the amide. The solution was then stirred and heated to 75° C. Thereafter, a solution of 0.2 gm. of potassium persulfate in a small amount of water was added. When the polymerization started after a short period of time, acompanied by the development of heat, the reaction mixture was cooled with ice water in such a way that the temperature of the reaction did not rise above 80° C. After the reaction subsided, the solution was stirred for an additional 2 hours while maintaining the temperature at 75° C. The solution thus obtained had a viscosity of 9880 centipoises at 20° C.

For the production of solid polyacrylic acid amide, methanol was slowly added to the viscous solution, accompanied by stirring, until no more precipitate formed. The precipitate was filtered off on a vacuum filter, the filter cake was washed with methanol and dried in a vacuum at 50° C. 19.5 gm. of solid polyacrylic acid amide were obtained. This solid polyacrylic acid amide was readily soluble in water.

In the same manner as described above, additional polymerizations were performed in which increasing amounts of copper sulfate were added to the reaction mixture, the remaining ingredients being the same. Table I shows the effect of varying the amounts of $CuSO_4.5H_2O$ added on the viscosity of the polymerized solution at 20° C. when starting with a 20% monomer solution.

Table I

| Gm. of $CuSO_4.5H_2O$ | Percent Concentration of Copper Ions Based on the Amount of Monomeric Amide | Viscosity in Centipoises |
| --- | --- | --- |
| 0.078 | 0.1 | 9,880 |
| 0.157 | 0.2 | 2,070 |
| 0.235 | 0.3 | 722 |
| 0.393 | 0.5 | 124 |
| 0.550 | 0.7 | 48 |
| 0.708 | 0.9 | 22 |

EXAMPLE II

In the same manner as described in Example I, solutions of 30 gm. of monomeric acrylic acid amide in 70 gm. of water containing varying amounts of $CuSO_4.5H_2O$ were polymerized with the aid of 0.3 gm. of potassium persulfate at temperatures of 75° C. to 80° C.

Table II shows the viscosity of the polymerizate solutions obtained in relation to the amount of copper added to the reaction mixture.

Table II

| Gm. of $CuSO_4.5H_2O$ | Percent Concentration of Copper Ions Based on the Amount of Monomeric Amide | Viscosity in Centipoises |
| --- | --- | --- |
| 0.354 | 0.3 | 1,126 |
| 0.590 | 0.5 | 841 |
| 0.824 | 0.7 | 324 |
| 1.059 | 0.9 | 92 |
| 3.530 | 3.0 | 9 |

EXAMPLE III 40 gm. of acrylic acid amide were dissolved in 60 gm. of water and 1.26 gm. of $CuSO_4.5H_2O$ were added to the solution. The solution was then heated to 60° C. accompanied by stirring. Thereafter, a solution of 0.4 gm. of potassium persulfate in water was added. After the polymerization had begun, which was recognized by the strong evolution of heat, the solution was cooled with ice water in order to keep the reaction temperature below 100° C. After the reaction had subsided, the solution was maintained at a temperature of 60° C. to 70° C. for two hours. The polymerizate solution had a viscosity of 1000 centipoises at 20° C.

Additional polymerizations were performed in the same manner only with the addition of somewhat larger quantities of $CuSO_4.5H_2O$. The results obtained from these runs are shown in Table III.

Table III

| Gm. of $CuSO_4.5H_2O$ | Percent Concentration of Copper Ions Based on the Amount of Monomeric Amide | Viscosity in Centipoises |
| --- | --- | --- |
| 1.260 | 0.8 | 1,000 |
| 1.571 | 1.0 | 96.2 |
| 1.890 | 1.2 | 55.6 |

EXAMPLE IV

In the same manner as described in Example III, solutions of 50 gm. of monomeric acrylic acid amide in 50 gm. of water were polymerized with the aid of 0.4 gm. of potassium persulfate at 60 to 100° C. in the presence of varying quantities of $CuSO_4.5H_2O$. The weight and concentration of copper ions added to the reaction mixture as well as the viscosity of the polymerizate solutions obtained thereby are shown in Table IV.

Table IV

| Gm. of $CuSO_4.5H_2O$ | Percent Concentration of Copper Ions Based on the Amount of Monomeric Amide | Viscosity in Centipoises |
| --- | --- | --- |
| 1.571 | 0.8 | 712 |
| 1.970 | 1.0 | 560 |
| 2.354 | 1.2 | 324 |
| 2.943 | 1.5 | 50 |

While I have described particular embodiments of the invention, it will be understood that the invention is not limited thereto and that various modifications and adaptations thereof may be made without departing from the spirit of the invention and the scope of the following claims.

I claim:

1. The process of producing clear, concentrated, aqueous solutions of water-soluble polyacrylic acid amide which consists of heating an aqueous solution containing in excess of 10% to about 50% by weight of monomeric acrylic acid amide as sole monomer and a water-soluble, free-radical-forming polymerization catalyst to temperatures up to about 100° C. in the presence of about 0.01% to about 3% by weight, based on the monomeric acrylic acid amide present in the solution, of copper ions for a time sufficient to polymerize said monomeric acrylic acid amide.

2. The process of producing clear, solid, water-soluble polyacrylic acid amide which consists of heating an aqueous solution containing in excess of 10% to about 50% by weight of monomeric acrylic acid amide as sole monomer and a water-soluble, free-radical-forming polymerization catalyst to temperatures up to about 100° C. in the presence of about 0.01% to about 3% by weight, based on the monomeric acrylic acid amide present in the solution, of copper ions for a time sufficient to polymerize said monomeric acrylic acid amide, flocculating the water-soluble polyacrylic acid amide by the addition of small amounts of a water-miscible organic solvent to the clear, concentrated aqueous solution of water-soluble polyacrylic acid amide and separating said clear, solid, water-soluble polyacrylic acid amide.

References Cited in the file of this patent

UNITED STATES PATENTS

| | | |
|---|---|---|
| 2,289,540 | Dittmar et al. | July 14, 1942 |
| 2,634,258 | Stewart | Apr. 7, 1953 |
| 2,789,099 | Rife et al. | Apr. 16, 1957 |
| 2,990,381 | Meinel | June 27, 1961 |

FOREIGN PATENTS

| | | |
|---|---|---|
| 898,552 | France | July 10, 1944 |